Aug. 15, 1961    D. C. WORLTON    2,995,925
ULTRASONIC FLAW DETECTION METHOD AND MEANS
Filed Oct. 29, 1957    2 Sheets-Sheet 1

INVENTOR.
Daniel C. Worlton
BY
Roland A. Anderson
Attorney

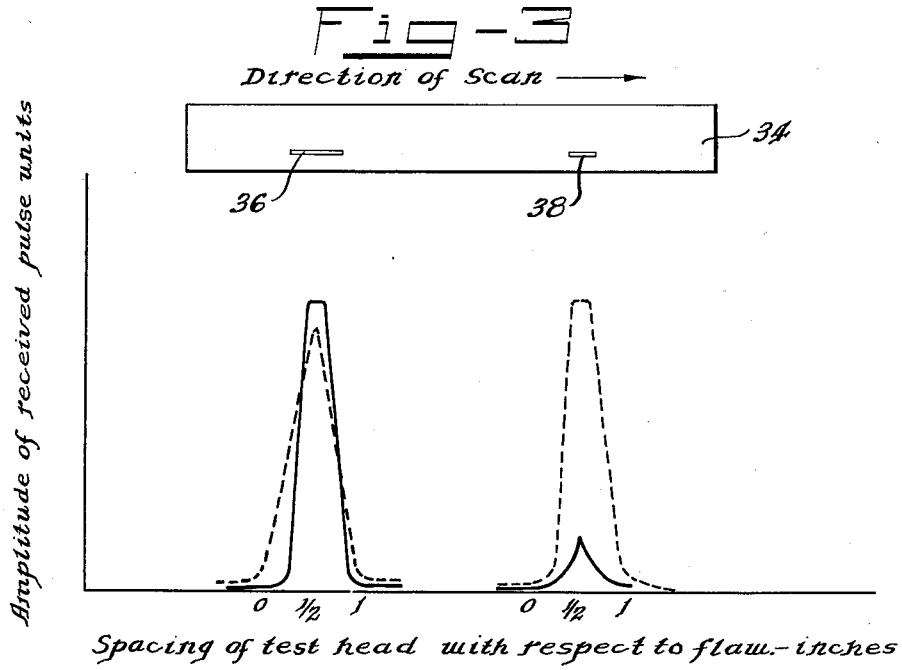
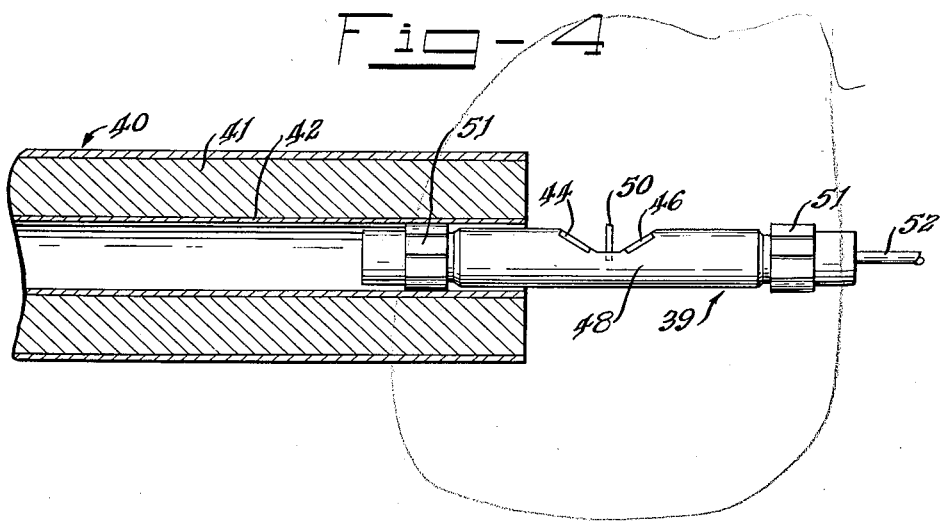

2,995,925
ULTRASONIC FLAW DETECTION METHOD AND MEANS
Daniel C. Worlton, San Jose, Calif., assignor to the United States of America as represented by the United States Atomic Energy Commission
Filed Oct. 29, 1957, Ser. No. 693,219
3 Claims. (Cl. 73—67.7)

This case relates to detecting flaws beneath the surface of objects and more particularly to the detection of these flaws by the use of ultrasonic waves.

The use of ultrasonic waves to detect flaws within objects is well known whereby a pulse of acoustical energy is directed toward the object along a normal to the surface thereof. A certain amount of the energy will be reflected back by the surface of the object while some of it will be transmitted into the interior. If a flaw, such as a void in the material is present in the interior, a certain portion of the energy will be reflected therefrom along the normal to the surface at a later point in time than that reflected from the surface. If the defect appears very close to the surface of the object, the time between the reflected pulse from the surface and the reflected pulse from the defect will be extremely short. To obtain resolution between the two echoed pulses it is necessary to utilize a transmitted pulse of very high frequency and short duration. Therefore, the receiver for analyzing the echoed information must necessarily be a highly sensitive wide frequency band device which greatly increases the cost of the necessary equipment. It would be to great advantage to eliminate the receipt of the surface echo in the receiving means which would permit the use of lower pulse frequencies and eliminate the need for a wide frequency band device.

In 1916 Horace Lamb mathematically proved that vibrational waves may be induced in a flat plate which travel in the direction of the plane of the plate, and he reported his findings in a paper entitled "On Waves in an Elastic Plate," printed in the "Proceedings of the Royal Society of London," Series A, volume XCII, page 114. Lamb's theories were experimentally studied by Floyd A. Firestone and Daniel S. Ling, Jr., who succeeded in experimentally generating the waves in plates that Lamb had predicted. Subsequently, these waves have come to be known as Lamb waves. The findings of Firestone and Ling are recorded in Letters Patent 2,536,128, issued to them as joint inventors, filed May 21, 1946. Firestone and Ling suggest methods whereby Lamb waves may be used for testing plates; however, there is no evidence that they were successful in applying these methods in practice. They suggested using a transmitting transducer set at an acute angle to the normal of the surface of the plate to induce Lamb waves of a particular mode and type in the plate. A receiving transducer was to be set at an acute angle different than that of the transmitting transducer so that a signal would be received only if a defect appeared in the plate which would set up a Lamb wave of the particular mode and type for which the receiving transducer was adapted to receive. It is evident, therefore, that the method suggested would not be useful in detecting flaws beneath the surface of objects having shapes other than flat plates. That is because their method depended upon setting up Lamb waves through the whole thickness of the object being tested (a plate), and such waves can not be set up in objects not having essentially parallel opposite surfaces, e.g., cylinders.

It is therefore an object of this invention to provide a method for detecting defects in elastic materials by the use of Lamb waves.

Another object of this invention is to provide a method for detecting flaws in objects having other geometric shapes besides plates.

A further object of this invention is to provide a device for detecting defects in elastic materials whereby transmitted pulses of low frequency and extended duration may be used.

Another object of this invention is to provide a device for scanning interior surfaces of objects to detect defects therebeneath.

Other objects and advantages of this invention will become obvious upon a study of the following detailed description with respect to the attached drawings in which:

FIGURE 3 is a graph showing the effect of varying the distance between the transmitting and receiving means on the amplitude response for different size flaws; and FIGURE 4 is an elevational view of a device for testing inside surfaces of tubular members.

The objects and advantages of this invention for detecting voids beneath the surface of an object may best be accomplished by transmitting a mechanically induced longitudinal wave of predetermined velocity into engagement with the surface of the object at a predetermined angle of incidence thereto. If the wave strikes the surface at a point adjacent to a void beneath the surface vibrational waves will be induced in the portion of the object between the void and the surface and these waves may be received from the object at an angle of exit equal to the angle of incidence. No waves will be generated in the plate and hence received if a void is not present beneath the surface of the object.

Figure 1:
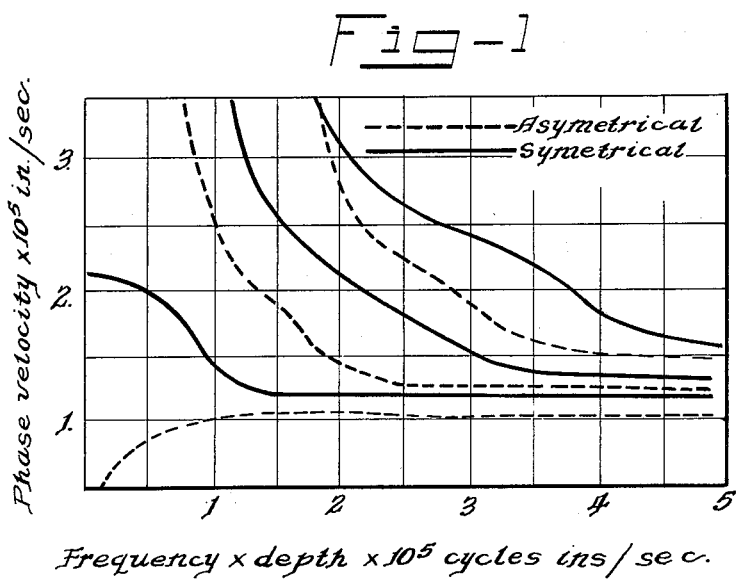
FIGURE 1 is a graph showing wave phase velocity plotted against the product of frequency and thickness for symmetrical and asymmetrical types of Lamb waves.

Horace Lamb, in his theoretical studies discussed above, grouped the infinite number of modes in which an elastic plate may vibrate into symmetrical and asymmetrical types according to the direction of the particle displacement. Unlike the more familiar longitudinal and shear modes, however, these waves travel in the elastic material with a phase velocity that is dependent upon the order of the mode, the frequency of the waves, and the thickness of the plate. FIGURE 1 shows how the phase velocity in aluminum varies with the mode, frequency and thickness of plate for the first three modes of the symmetrical and asymmetrical types, the symmetrical modes being represented by the solid curves and the asymmetrical modes being represented by dotted curves. Here, it is to be noted that phase velocity refers to the rate of travel of a disturbance such as the crest of a wave in an infinitely long wave train and is to be distinguished from the more usual group velocity concept which refers to the velocity of a short group of waves. The phase velocity may be compared with the velocity of the point of contact of an ocean wave with the beach when the ocean wave approaches the beach at an angle to a straight line parallel to the beach shore. The phase velocity is therefore dependent upon the incident velocity of the wave and the angle at which it approaches, the formula $$V_p = \frac{V_1}{\sin \theta}$$

representing the mathematical relationship between the parameters where $V_1$ is the incident velocity, $V_p$ is the phase velocity, and $\theta$ is the incident angle. Thus, if an impinging beam energizes a plate such that its phase velocity is equal to the phase velocity of a particular Lamb wave mode, as shown in FIG. 1, that mode will be excited in the plate. To determine whether the plate is vibrating in the desired mode one may simply receive a portion of the vibrational energy as it emits from the plate at the same angle as the angle of incidence.

Figure 2:
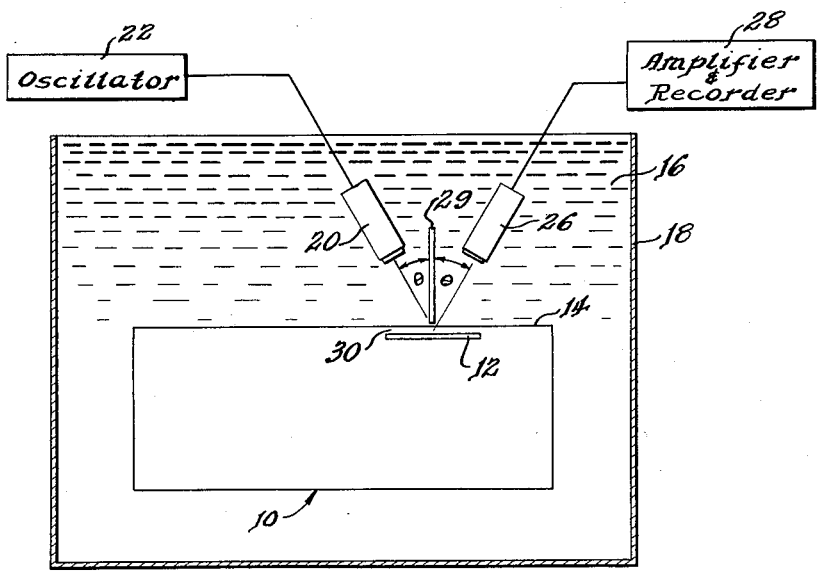
FIGURE 2 is a vertical section, largely diagrammatic, showing a method and means for detecting a flaw beneath the surface of an object according to the teachings of this invention.

In FIGURE 2 of the drawings is portrayed a device for executing the operations of this invention in which a test block 10 with a laminar flaw 12 close to the upper surface 14 of the block 10 is submerged in a liquid bath 16 contained in vessel 18. A transmitting transducer 20 connected to an oscillator 22 is positioned above the flaw 12 within the water bath 16 so that mechanically induced longitudinal waves strike the surface 14 at an angle $\theta$ to a normal to the surface. A receiving transducer 26 is positioned above the flaw 12 in the water bath 16 so that waves emitted from the surface 14 will be received at the same angle $\theta$ to a normal to the surface 14. An amplifier and recorder 28 are connected to the receiving transducer so that the energy received thereby may be analyzed. An acoustical shield 29 is positioned between the transducers 20 and 26 which extends almost to the surface of the object 10. The shield 29 serves to separate the waves transmitted by the transducer 20 and those received by the transducer 26 so that echo waves rebounding from the surface 14 of the object 10 are not received and confused with the Lamb waves.

It has been observed that the presence of flaws of this type can clearly be revealed by Lamb waves because the flaw 12 allows the portion 30 between it and the surface 14 to vibrate as though it were a section of thin plate. With the transmitting and receiving transducers 20 and 26, respectively, at the proper angle to induce a Lamb wave mode in the portion 30 above the flaw, a large signal is received and recorded for analyzing. The signal disappears, however, when a flaw free section of the block is inspected, since, in this case, no Lamb waves are established.

A Lamb wave of the first symmetrical mode was received in testing a block 10 having a flaw 0.060" below the surface 14 when the transducers 20 and 26 were set at about 30° using a test frequency of 2.25 megacycles per second. That was in good agreement with the value calculated from the equation $$V_p = \frac{V_1}{\sin \theta}$$

with $V_1$ taken as 57,000" per second (the velocity of sound in water) and $V_p$ obtained from FIGURE 1 as 120,000" per second, the frequency depth product equalling $1.35 \times 10^5$ cycles in./sec. Any desired mode could have been established simply by adjusting the angle $\theta$ to obtain a suitable phase velocity with respect to FIGURE 1.

The above illustration evidences one of the more striking advantages of the invention in that the flaw so close to the surface may be clearly detected with the comparatively low ultrasonic test frequency of 2.25 megacycles. This is due mainly to the fact that the wave forms received by the receiving transducer 26 are almost completely devoid of the usually troublesome surface echo. The transducers 20 and 26 are positioned at an angle substantially less than 90° from the normals to the surface and hence the reflected surface echo is substantially below the maximum which would occur if they were positioned at right angles to the normals. Also, the transducers are positioned so that the normals to the transducer surfaces drawn through their center points ordinarily do not intersect at the surface of the sample but at some point below the surface. This spacing also permits the apparatus to selectively pass testing samples having less than a minimum dimension void as hereinafter described. The small amount of surface reflected energy that would reach the receiver has been eliminated effectively by inserting the acoustical barrier 29 between the transducers. With conventional testing methods the problem of distinguishing the flaw echo from the surface echo becomes increasingly difficult as flaws are closer to the surface, whereas, with Lamb waves, the difficulty is eliminated since the surface echo is not present. Consequently, the testing pulse may have a time length as long as desired and the expense and complexities of a wide band electronic system with the necessary synchronizers and gate circuits can be avoided.

Another advantage of this invention may readily be seen in reviewing FIGURE 1 of the drawings where it shows that the first mode curves are horizontal for frequency depth products larger than about $1.4 \times 10^5$ cycles inches per second. This means that with a given test frequency and elastic material, flaws may vary in depth up to a minimum value and be detected by a fixed angular setting of the transducers. Moreover, increasing the test frequency extends the range closer to the surface. At 10 megacycles, for example, the minimum depth in aluminum is extended to within .014" of the surface.

It is often desirable, particularly in automatic testing, to make a discrimination of the defects encountered according to flaw size. This permits acceptance of test pieces that contain flaws small enough to be considered satisfactory for the particular application for which the pieces are intended. With single crystal testing some information pertaining to the size of a flaw can usually be ascertained from the amplitude of its echo pulse although not very precisely since the echo amplitude is dependent upon other factors as well. Lamb wave testing offers an advantage in this regard because the magnitude of the response of any given flaw can be controlled by adjusting the spacing of the transmitting and receiving transducers relative to one another. Small flaws can be ignored simply by separating the transducers the proper distance. This is illustrated by the curves in FIGURE 3 of the drawings which were obtained from a test block 34 containing built-in defects 36 and 38. The larger defect 36 measured ⅜" and the smaller defect 38 measured 3⁄16". With a fixed angular setting the test head containing the transmitting and receiving transducers was twice scanned along the test block. In the first scan, represented by the dotted curves in the figure, the transducers were placed as close together as possible so that the longitudinal axis of the two transducers intercepted each other at the surface of the test block, as shown in FIGURE 2. It will be seen in FIGURE 3, that both flaws were observed to respond with nearly the same amplitude. In the second scan represented by the solid curve of the figure the transducers were separated so that the longitudinal axes of the transducers intersected the surface with a 9⁄32" spacing between them. The amplitude response of the smaller flaw 38 was greatly reduced while the amplitude response for the larger flaw 36 increased slightly. Thus, by properly spacing the transducers, an automatic test can be devised in which only flaws larger than a predetermined size are rejected. The flaw sizes may be distinguished by monitoring the amplitude of the received pulse by electronic means well known to the art and not forming a part of this invention.

The processes of this invention may be used to detect flaws in objects having shapes other than plates and blocks which have flat surfaces. Defects beneath the surface of cylindrically shaped objects may be readily detected with Lamb waves making them especially useful in detecting unbonded portions between a cylindrical core and its tubular jacket, such as found in the nuclear reactor fuel element art. The use of Lamb waves according to the methods taught by this invention are particularly adaptable to testing such bonds because of the capability to detect flaws very close to the surface and, also, because of the capability to discriminate against flaws of lesser size. Jacketed cylindrical objects may be readily tested for flaws by the methods of this invention by rotating them along their longitudinal axis while moving the test head containing the transmitting and receiving transducers along the surface of the rotating rod in a direction parallel to the axis of the object.

In FIGURE 4 is shown a device 39 for testing the inside surface of a hollow cylinder 40 to detect unbonded areas between the core 41 and the inside jacket 42. The device 39 has a transmitting transducer 44 and a receiving transducer 46 fixedly set in a plastic rod 48 at the proper angle with a normal to the inside surface of the object so that Lamb waves of a particular type and mode will be set up in the jacket 42 if there is an unbonded area between the core 41 and the jacket 42 at the point being tested. An acoustical barrier 50 is also fixedly placed in the rod between the transducers 44 and 46 to prevent the reflection of surface echoes and the receipt of direct vibrational energies from the transmitting transducer 44. Nylon bearings 51 are placed at each end of the plastic rod 48 and rotate with the hollow cylinder 40 as it is scanned and serve to orient the transducers 44 and 46 with respect to the cylinder wall. The rod 48 is prevented from rotating with the cylinder 40 but is caused to move longitudinally with respect thereto so as to scan the total inside surface for defects in the bondings. The appropriate wiring for the transducers 44 and 46 is brought out through the tubing 52 at the end of the rod 48. The electric signals resulting from the scan may be used to draw a map of the inner surface or may be used to operate a device which would automatically reject a tested article which has a flaw greater in size than a predetermined minimum.

Lamb waves also offer a convenient method for testing thin metal strips for detecting abnormal grain structures and the presence of laminar flaws. It has been observed that in metals there is an increase of ultrasonic absorption with increasing grain diameter. However, in applying this observation to testing thin sections with conventional means, difficulty is encountered in providing a transmitting pulse short enough in time to resolve the front and back surface echoes. Lamb waves furnish an alternative approach to the problem since they are readily established in thin sections and since they also travel in metals with an attenuation that increases with the size of grain structure. In performing a test for abnormal grain structure the transducer angles are set to establish a given mode and type of Lamb wave in the sample under test and then left fixed as other samples with different grain structures are tested. The abnormal grain structures then can be detected from their effect on the amplitude of the received signal.

In testing thin strips for laminar flaws, the absence rather than the presence of waves reveal a flaw. To test a thin strip of a particular depth the frequency is selected so that the frequency depth product is at a point on the particular mode curve at which a further decrease in depth will rapidly change the phase velocity and hence the transducer angles at which that particular mode of Lamb wave would be generated. In testing a flaw free section of this strip at the selected transducer angle and frequency a Lamb wave of the chosen mode would be generated. However, if a section strip containing a laminar flaw were tested the received signal woud disappear since the flaw would in effect reduce the thickness of the plate. For the purpose of illustration, suppose that it is desired to test an aluminum sheet 0.030″ thick. It may be determined from the foregoing formula and the curves in FIGURE 1 that Lamb waves of the first symmetrical mode may be established in a flaw free section of the strip at an angular setting of the transducers of approximately 30° and a test frequency of 5 megacycles per second. As seen from FIGURE 1, a frequency-depth product smaller than the value under consideration i.e., $1.5 \times 10^5$ cycles inch per second, rapidly changes the angular settings at which Lamb waves of the first mode are established. If the laminar flaw is present, the frequency-depth product decreases causing a rapid change in the phase velocity and hence the transducer angle at which the waves would be induced so that the waves would disappear. Conventional methods for this type of testing have been of little value because of the difficulties in distinguishing between front and back surface echoes without using extremely high-frequency pulses of very short length which dictate the use of expensive, wide band, fast response electronic equipment.

It is the intention of the inventor not to be limited by the detailed description of the method and means in the aforegoing specification but to be awarded the full breadth of his discovery as defined in the appended claims.

What is claimed is:

1. A method of detecting a void immediately beneath the surface of an object comprising transmitting a wave of predetermined velocity and frequency into engagement with said surface of said object adjacent said void at a predetermined angle thereto, said incident angle being determined with respect to the phase velocity, incident wave velocity, incident wave frequency and the estimated depth of said void whereby Lamb waves of a particular type and mode are induced only in the portion of said object between the void and the surface, and receiving the Lamb waves from said portion at an angle of exit equal to said angle of incidence.

2. A method of detecting a void immediately beneath the surface of an object comprising transmitting a mechanically induced longitudinal wave of predetermined velocity and frequency through a liquid medium and into engagement with said surface of said object adjacent said surface at a predetermined angle thereto, said incident angle being determined with respect to the phase velocity, incident wave velocity, incident wave frequency and the estimated depth of said void whereby Lamb waves of a particular type and mode are induced only in the portion of said object between the void and the surface, and receiving only the Lamb waves of said particular type and mode from said portion at an angle of exit equal to said angle of incidence.

3. A device for testing a void within an estimated range of depth of the inside surface of a tubular object comprising a plastic rod longitudinally translatable within said tubular object; acoustical wave generating means including a transmitting crystal, said transmitting crystal fixedly positioned within said rod at a predetermined angle to a normal to the surface of said rod, said angle being determined with respect to the phase velocity, incident wave velocity, incident wave frequency, and the estimated depth of said void whereby Lamb waves of a particular type and mode are introduced only in the portion of said object between the void and the surface; a receiving crystal fixedly positioned in said rod longitudinally adjacent to said transmitting crystal and at a predetermined angle equal to the angle of said transmitting crystal; a transversely positioned acoustical shield between said transmitting crystal and said receiving crystal; a nylon bearing rotatably mounted on each end of said rod adapted to engage the inside surface of said tubular object and rotate therewith as the rod is longitudinally translated within said tubular object.

References Cited in the file of this patent

UNITED STATES PATENTS

| 2,536,128 | Firestone et al. | Jan. 2, 1951 |
| 2,612,772 | McConnell | Oct. 7, 1952 |
| 2,799,157 | Pohlman | July 16, 1957 |

FOREIGN PATENTS

| 719,641 | Great Britain | Dec. 8, 1954 |
| 771,362 | Great Britain | Apr. 3, 1957 |
| 1,138,294 | France | Jan. 28, 1957 |